Patented May 29, 1934

1,960,262

UNITED STATES PATENT OFFICE 1,960,262

SYNTHETIC RESIN AND COMPOSITION CONTAINING THE SAME

Camille Dreyfus, New York, N. Y., and George Schneider, Montclair, N. J., assignors to Celanese Corporation of America, a corporation of Delaware No Drawing. Application August 24, 1929, Serial No. 388,257

16 Claims. (Cl. 260—3)

This invention relates to the preparation of resins, and relates more particularly to synthetic resins prepared by the condensation of thioalcohols or thiophenols with aldehydes, ketones and the like.

An object of our invention is to prepare resins by the condensation of mercaptans, such as thioalcohols or thiophenols with aldehydes or other compounds having an active methylene group, or ketones. Another object of this invention is to prepare compositions containing derivatives of cellulose and synthetic resins formed by the condensation of thioalcohols or thiophenols with aldehydes, ketones and the like. Other objects of our invention will appear from the following detailed description.

The preparation of synthetic resins by the condensation of phenols, substituted phenols, cresols and the like with formaldehyde is well-known and these resins have been employed for many purposes. We have found that if instead of employing phenols and the like as the starting material in making resins, compounds are used wherein the oxygen of the hydroxide group is replaced by sulfur, resins of greatly improved properties are formed.

In accordance with our invention, we prepare synthetic resins of improved properties by condensing sulpho- or thioalcohols or phenols with aldehydes or other compounds having an active methylene group in the presence or absence of a suitable catalyst. The resins so formed may be employed for any suitable purpose for which synthetic resins of similar type have been used. We have found them particularly useful in the making of coating composition in conjunction with derivatives of cellulose. Broadly our invention relates to resins of the phenol-aldehyde or phenol-ketone type wherein one or more oxygen atoms are replaced by sulfur.

Any suitable mercaptan may be used in making the resin, these compounds being represented by the general formula RSH, where R is an alkyl, aryl or aralkyl group or substituted group. Examples of such compounds are the thio phenols, such as thiophenol itself, $C_6H_5SH$, thiocresol, $CH_3.C_6H_4.SH$ or thioxylenol $CH_3.CH_3.C_6H_3SH$. An example of another mercaptan that may be used is benzyl mercaptan, $C_6H_5CH_2SH$. More complex compounds may be employed, such as di-thiophenylol propane

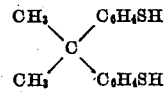

which may be formed by the condensation of thiophenol with acetone.

The mercaptan may be condensed with a suitable aldehyde such as formaldehyde, paraformaldehyde, or acetaldehyde, or any other compound having an active methylene group, such as hexamethylenetetramine, $(CH_2)_6N_4$, or with a ketone such as acetone. The proportions of the mercaptan and the aldehyde or ketone may be varied to meet the particular requirements.

As stated the resin may be formed by the condensation of the thiophenol and the aldehyde or the ketone in the absence of a catalyst or in the presence of one, depending on the particular reactants employed and the nature of the resin desired. If a catalyst is employed it may be an acid catalyst such as hydrochloric acid or phosphoric acid, or it may be an alkaline catalyst. The resin formed may be a fusible and soluble type, and this fusible and soluble type may be condensed with further quantities of aldehyde to form the infusible and insoluble type.

A particularly interesting application of the fusible and soluble type of resin made in accordance with this invention is in the preparation of lacquers or coating compositions containing a suitable derivative of cellulose. This derivative of cellulose may be cellulose nitrate or it may be an organic derivative of cellulose such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

In making a liquid coating composition the resin and the derivative of cellulose may be dissolved in any suitable solvent or solvent mixture containing low boiling, medium boiling and/or high boiling solvents as is well understood in the lacquer art. The lacquer may also contain suitable plastifiers such as triacetin, diethyl tartrate, dibutyl tartrate and the like.

The lacquer may also contain pigments and dyes to impart the desired color.

Resins prepared in accordance with our invention may be associated with the derivative of cellulose, suitable plastifier and solvents to form plastic compositions which may be worked up in any known manner into sheets, blocks, tubes, rods or any other article of desired shape. Films to be used as a base for photographic films or for other purposes may be made from the derivative of cellulose and the resin. Likewise filaments and yarns for textile or other purposes may be made from solutions of the derivative of cellulose and the synthetic resin. Molding powders containing the derivative of cellulose, the synthetic resin and suitable plastifiers, but substantially no volatile solvent, may be made, and these powders are adapted to be molded under heat and pressure to any desired shape.

It is to be understood that the foregoing detailed description is given merely by way of illustration, and that many variations may be made therein, without departing from the spirit of our invention.

Having described our invention, what we claim and desire to secure by Letters Patent is:

1. Method of preparing resins comprising condensing a mercaptan with a compound selected from the group consisting of aldehydes and ketones.

2. Method of preparing resins comprising condensing a thiophenol with a compound selected from the group consisting of aldehydes and ketone.

3. Method of preparing resins comprising condensing thiophenol with an aldehyde.

4. Method of preparing resins comprising condensing thiophenol with a ketone.

5. Method of preparing resins comprising condensing thiophenol with formaldehyde.

6. As a new product, a sulfur-containing condensation product of a mercaptan with a reactive methylene compound.

7. A synthetic resin formed by the condensation of a mercaptan with a compound selected from the group consisting of aldehydes and ketones.

8. A synthetic resin formed by the condensation of a mercaptan with an aldehyde.

9. A synthetic resin formed by the condensation of a mercaptan with a ketone.

10. A synthetic resin formed by the condensation of a thiophenol with a compound selected from the group consisting of aldehydes and ketones.

11. A synthetic resin formed by the condensation of a thiophenol with an aldehyde.

12. A synthetic resin formed by the condensation of thiophenol with formaldehyde.

13. Method of preparing resins comprising condensing a mercaptan with an aliphatic compound selected from the group consisting of aldehydes and ketones.

14. Method of preparing resins comprising condensing thiophenol with an aliphatic aldehyde.

15. A synthetic resin formed by the condensation of a mercaptan with an aliphatic compound selected from the group consisting of aldehyde and ketones.

16. A synthetic resin formed by the condensation of a thiophenol with an aliphatic aldehyde.

CAMILLE DREYFUS.
GEORGE SCHNEIDER.